United States Patent
Kim (10) Patent No.: US 6,834,735 B2
(45) Date of Patent: *Dec. 28, 2004

(54) VEHICLE BONNET HINGE (75) Inventor: Ho Kim, Gunpo-si (KR)

(73) Assignee: Kia Motors Corporation, Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 10/160,962

(22) Filed: May 31, 2002

(65) Prior Publication Data

US 2003/0010552 A1 Jan. 16, 2003

(30) Foreign Application Priority Data

Jul. 10, 2001 (JP) .......................................... 2001-41339

(51) Int. Cl.[7] .............................................. B62D 25/10
(52) U.S. Cl. .................................... 180/69.21; 180/274
(58) Field of Search .............................. 180/274, 69.21, 180/69.22, 69.23, 89.13, 89.14, 271; 16/361, 366

(56) References Cited

U.S. PATENT DOCUMENTS

| | | | | |
|---|---|---|---|---|
| 3,815,176 A | * | 6/1974 | Porter | ........................ 16/288 |
| 4,206,944 A | * | 6/1980 | Kumagai et al. | .............. 296/76 |
| 6,292,978 B1 | * | 9/2001 | Lakoduk et al. | ................ 16/82 |
| 6,330,734 B1 | * | 12/2001 | Cho | ............................. 16/376 |
| 6,442,801 B1 | * | 9/2002 | Kim | ............................. 16/361 |
| 6,447,045 B1 | * | 9/2002 | Dickson et al. | ......... 296/100.08 |

FOREIGN PATENT DOCUMENTS

| | | | |
|---|---|---|---|
| FR | 2664555 | * | 1/1992 |
| JP | 2002-129823 | * | 5/2002 |

* cited by examiner

Primary Examiner—Bryan Fischmann
(74) Attorney, Agent, or Firm—Christie, Parker and Hale, LLP (57) ABSTRACT

A vehicle hood hinge is provided, which includes a hinge arm coupled with a hood, and having first and second hinge holes. First and second links are coupled at their upper ends, respectively, to the first and second hinge holes by axial pins. A hinge support having a hinge hole is rotatably coupled with a lower end part of the second link by an axial pin and coupled via coupling holes and bolts with a vehicle body. A slot is longitudinally formed in the hinge support. A plate spring is fixedly mounted at an end of the slot, and formed with a holding shoulder for preventing the hinge pin from deviating from a normal hinge operation position under normal circumstances, but allowing the hinge pin to deviate from the normal hinge operation position by moving along the slot when an external impact is applied.

2 Claims, 7 Drawing Sheets

FIG. 1

PRIOR ART

FIG. 2

PRIOR ART

FIG. 3

PRIOR ART

FIG. 9

VEHICLE BONNET HINGE

CROSS REFERENCE TO RELATED APPLICATION

This application claims priority of Korean Patent Application No. 2001-41339, filed on Jul. 10, 2001.

BACKGROUND OF THE INVENTION (a) Field of the Invention

The present invention relates to a vehicle hood hinge, and more particularly to a hinge of a vehicle hood for withdrawing a hood of a vehicle backwardly for preventing a pedestrian from being injured by a collision with the hood when the body of the pedestrian contacts the hood due to a head-on collision with the vehicle which is running or moving.

(b) Description of the Related Art

Recently, attempts to minimize the shock due to the collision of a vehicle with a pedestrian include deforming the vehicle body, such as the hood in accordance with pedestrian safety regulations, which are expected to be enacted and enforced in several different countries.

The pedestrian safety regulations are based on impact values taken from firing a head form (which simulates the head of a pedestrian) at a speed of 40 kph (kilometers per hour), wherein it is assumed that a pedestrian collides with an end part of a glass at a rear part of a hood, that is, the head of the pedestrian collides with the vehicle in the vicinity of a hinge part.

Figure 1:
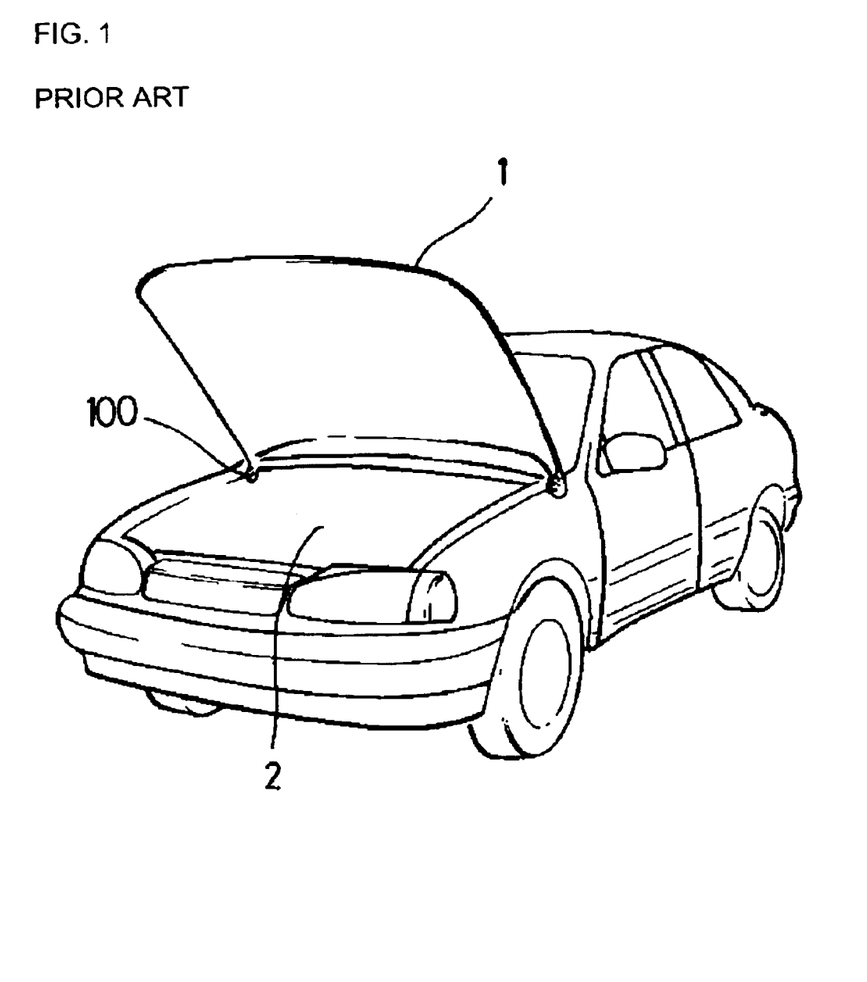
FIG. 1 is a perspective view showing a prior art hood mounted to a vehicle.

In general, a front part of a vehicle is formed with an engine room 2 for receiving an engine and other various parts, and a hood 1 is mounted to an upper end part of the engine room rotatably with respect to a hinge 100 for protecting the engine room, as shown in FIG. 1.

Figure 2:
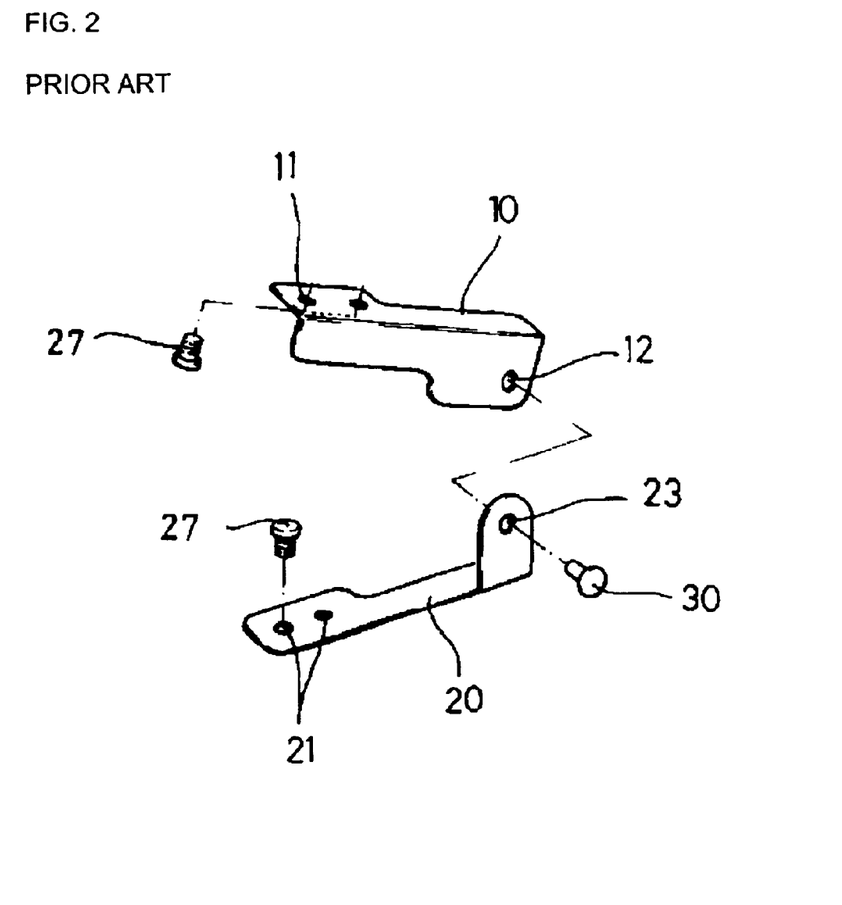
FIG. 2 is a perspective view showing a disassembled state of the prior art hinge for the vehicle hood.

The prior art hinge for a hood of a vehicle, as shown in FIG. 2, includes: a hinge support 20 having a rear part formed with a link piece integrally and upwardly extended at the rear part and formed with a hinge hole 23, and a front part penetrated with coupling holes 21; a hinge arm 10 having an insertion hole 12 formed at a rear part with an inner diameter equal to the inner diameter of the hinge hole of the hinge support 20 and coupling holes 11 penetrated in a front part; and a hinge pin 30 for penetrating both of the insertion hole 12 of the hinge arm and the hinge hole 23 of the hinge support 20.

In the above prior art vehicle hood hinge, the insertion hole 12 of the hinge arm 10 is aligned with the hinge hole 23 of the link piece of the hinge support 20 to allow the hinge pin 30 to be inserted into the insertion hole and the hinge hole; and the hinge support 20 and the hinge arm 10 (coupled by the hinge pin 30) are coupled with a vehicle body by bolts 27 via the coupling holes 21 of the hinge support and the coupling holes 11 of the hinge arm, in such a manner that a top surface of the vehicle body is coupled with a bottom surface of a hood 1 and a bottom surface of the hinge support 20 is coupled with a top surface of the hinge arm 10, so that the hood 1 is opened or closed by rotation with respect to the hinge pin 30.

In the prior art vehicle hood hinge as above, the hinge arm 10 (which contacts the bottom surface of the hood 1 at the top surface and is coupled by the bolt 27) is fixed and coupled with the hinge support 20 (which contacts the top surface of the vehicle body and is coupled by the bolt 27) by the hinge pin 30.

Therefore, if the pedestrian collides head-on with the vehicle while the vehicle is running or moving and the body of the pedestrian contacts the hood 1, the pedestrian becomes injured seriously by the impact energy generated by the collision with the vehicle.

Figure 3:
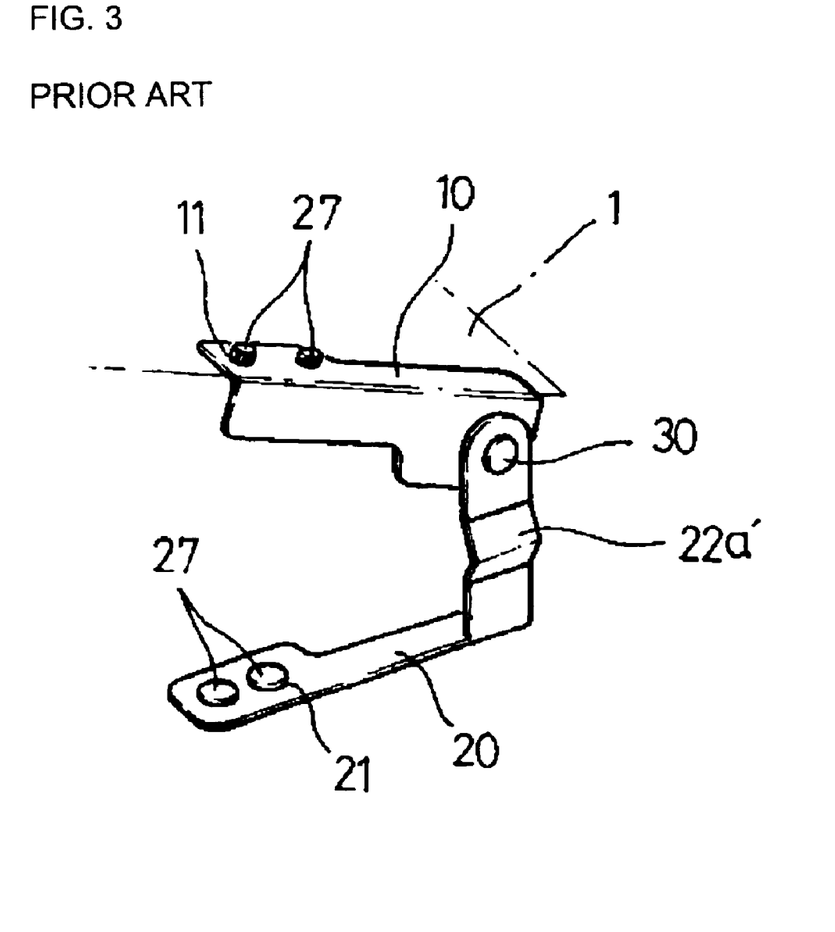
FIG. 3 is a perspective view showing an example of another prior art hinge for a vehicle hood.

In the meantime, in order to resolve the above problems of the prior art, as shown in FIG. 3, it has been suggested to form a bead part 22a' in the link piece of the hinge support 20, which is formed with the hinge hole 23 with the same inner diameter as the inner diameter of the insertion hole 12 of the hinge arm 10 and is coupled to the hinge arm by the hinge pin 30.

According to the bead structure, when the pedestrian collides head-on with the driving or moving vehicle, the bead part 22a' formed in the link piece of the hinge support 20 becomes deformed, absorbing the impact energy, thereby reducing the injury of the pedestrian.

The prior art hood hinge has, however, a problem that it is impossible to control a breakage load by the only bead part 22a', which is formed in the link piece of the hinge support 20 to be deformed for absorbing the impact energy, so that the injury of the pedestrian may not be reduced effectively.

SUMMARY OF THE INVENTION

Accordingly, the present invention is directed to a vehicle hood hinge that substantially obviates one or more of the problems due to limitations and disadvantages of the prior art.

An object of the present invention is to provide an improved vehicle hood hinge, which may absorb the impact energy by moving a lower end part of a first link along a slot to move a hood backwardly, so that a pedestrian may be prevented from being injured seriously by the hood, when the pedestrian collides head-on with a running or moving vehicle.

Another object of the present invention is to provide a vehicle hood hinge that may minimize an impact value applied to the head of a pedestrian for safely protecting the pedestrian during a head-on collision of the pedestrian with a driving or moving vehicle.

A further object of the present invention is to provide a vehicle hood hinge that may meet the pedestrian safety regulations, which are expected to be enforced in several different countries.

To achieve these and other advantages and in accordance with the purpose of the present invention, as embodied and broadly described, a vehicle hood hinge includes: a hinge arm having a surface contacting a bottom surface of a hood 1 at a top surface and penetratingly formed with coupling holes to be coupled with the hood and a side surface penetrating formed with a first hinge hole and a second hinge hole respectively at a front part and a rear part; a first link and a second link, of which upper end parts are respectively coupled with the first hinge hole and the second hinge hole of the hinge arm by axial pins; a hinge support formed with a hinge hole at a side to be rotatably coupled with a lower end part of the second link by an axial pin and coupling holes at both sides of a lower end part to be coupled with a vehicle body by bolts in contact with a top surface of the vehicle body at a bottom surface; a slot formed longitudinally in the hinge support; and a plate spring fixedly mounted at an end of the slot and formed with a holding shoulder for preventing the hinge pin from deviating from a normal hinge operation position under normal circumstances, but allowing the hinge pin to deviate from the normal hinge operation position by moving along the slot when an external impact is applied.

Therefore, the hinge pin forms a hinge shaft at a normal position when the hood is normally opened or closed, while the hinge pin is deviated from the normal position for reducing impact force when the head of a pedestrian collides with a top surface of the hood.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to a preferred embodiment of the present invention, examples of which are illustrated in FIG. 4 to FIG. 9.

Figure 4:
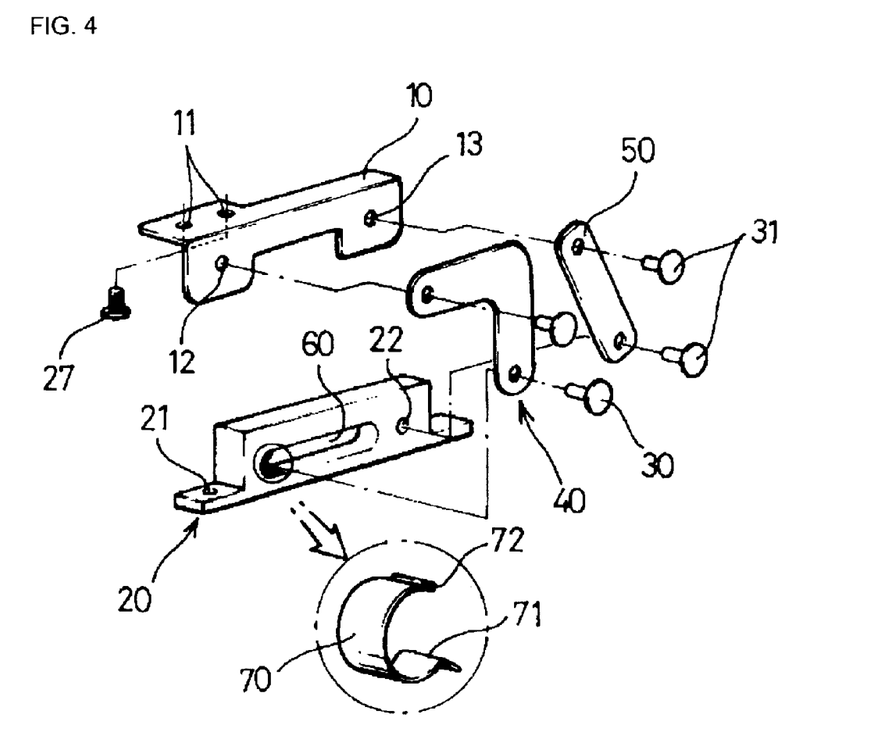
FIG. 4 is a perspective view showing a hinge for a vehicle hood according to the present invention, which is disassembled.
Figure 5:
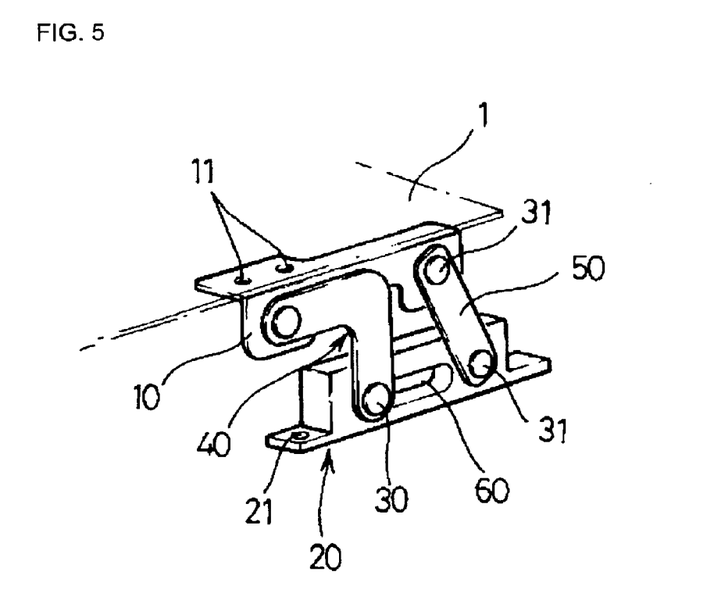
FIG. 5 is a perspective view showing a hinge for a vehicle hood according to the present invention, which is assembled.
Figure 6:
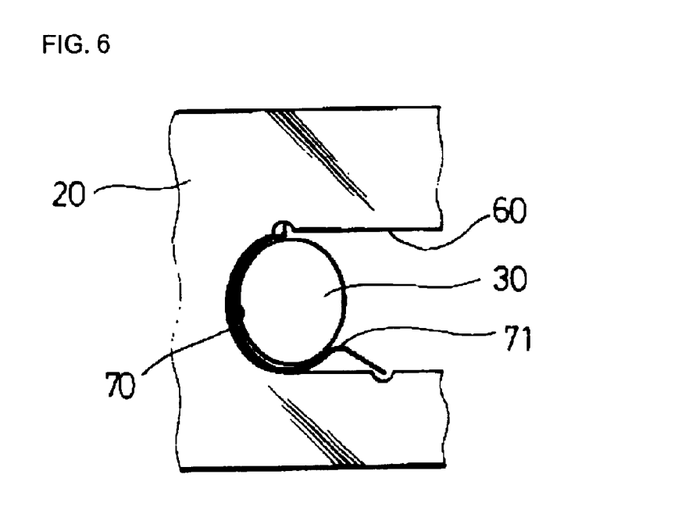
FIG. 6 is an expanded view showing principal parts of the present invention.

FIG. 4 to FIG. 6 respectively show a structure of a vehicle hood hinge according to a preferred embodiment of the present invention, wherein FIG. 4 is a perspective view of the vehicle hood hinge that is disassembled, FIG. 5 is a perspective view of the vehicle hood hinge that is mounted to a vehicle hood, and the FIG. 6 is a front view showing the vehicle hood hinge that a hinge support is coupled with by a hinge pin and also showing a plate spring coupled to a slot.

Figure 7:
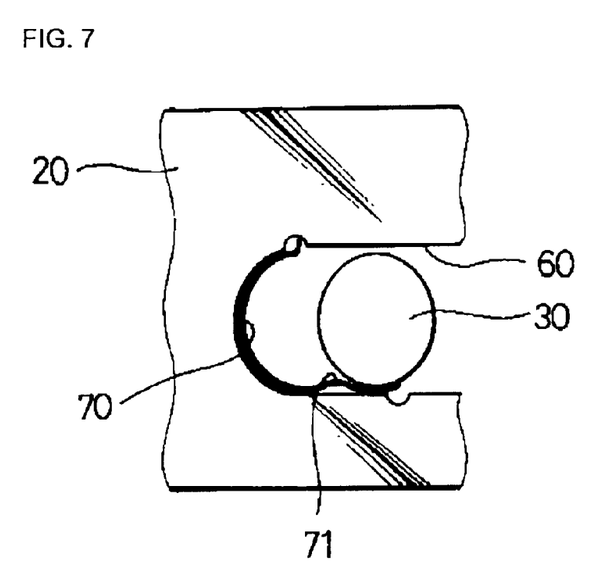
FIG. 7 is an expanded view showing a state that a plate spring mounted in a slot is deviated from a pin in the hinge of the vehicle hood according to the present invention.

FIG. 6 shows a partially expanded view of a hinge pin 30 that is prevented from deviating from a normal hinge operation position by a plate spring 70 under normal circumstances, and FIG. 7 is an expanded view of the hinge pin 30 that deviates from the plate spring 70 by moving along a slot 60, which is longitudinally formed in the horizontal direction, for absorbing impact, when a pedestrian collides head-on with a top part of a hood 1 and collision impact is applied to the top part of the hood.

Figure 8:
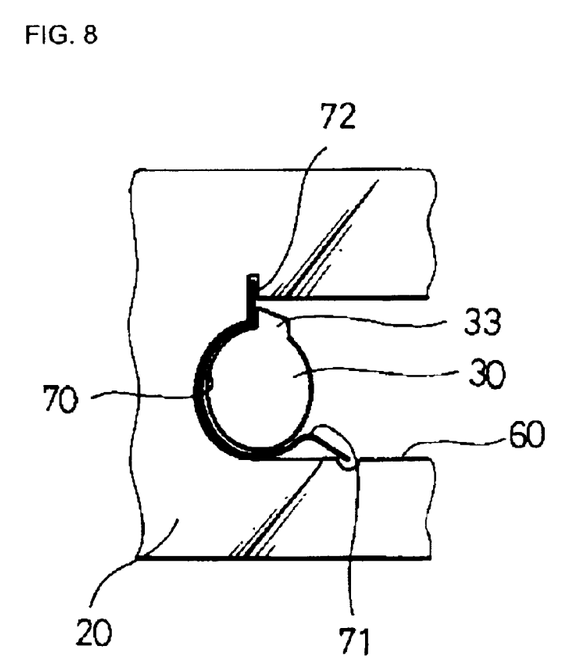
FIG. 8 is an expanded view showing principal parts of the vehicle hood hinge according to the present invention.
Figure 9:
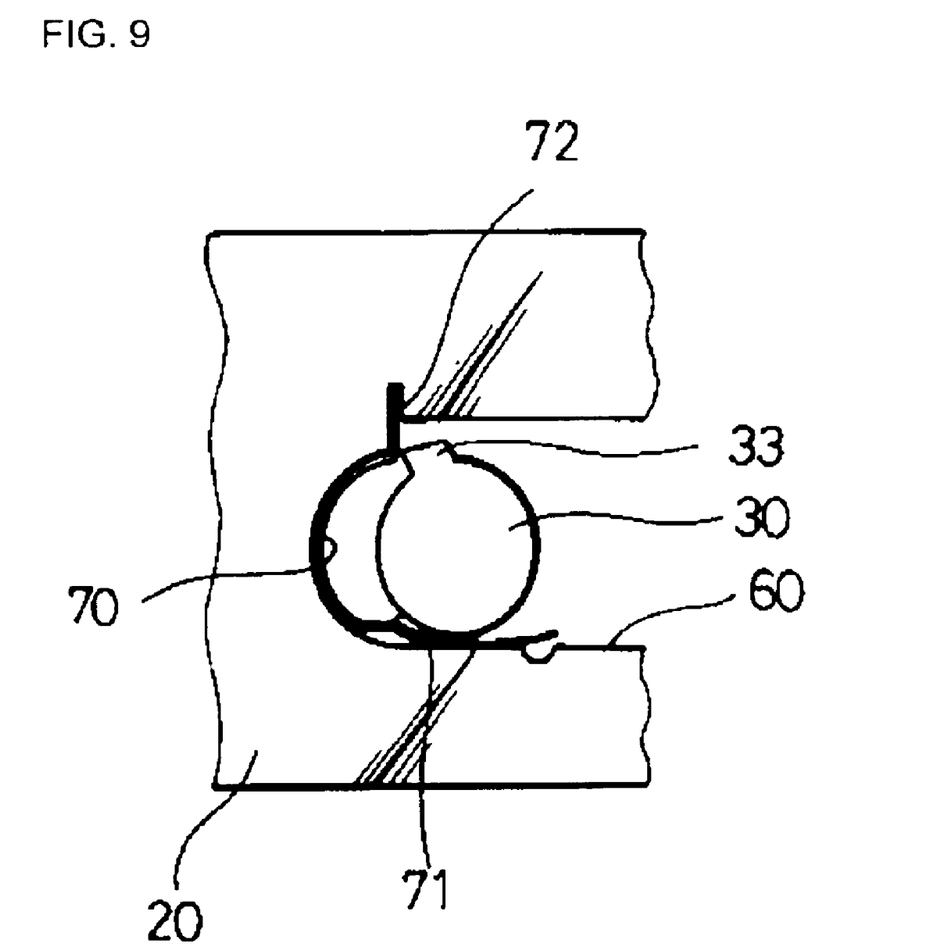
FIG. 9 is an expanded view showing an operation state of the vehicle hood hinge according to the present invention.

FIG. 8 and FIG. 9 show another embodiment of the present invention, wherein FIG. 8 is a partially taken expanded view of the hinge pin that is prevented from deviating from the normal hinge operation position by the plate spring 70 during normal circumstances, and FIG. 9 is an expanded view of the hinge pin 30 that deviates from normal hinge operation position by moving along a slot 60 that is formed longitudinally in the horizontal direction, when impact is applied to the top part of the hood 1 due to a collision with a pedestrian.

A hinge arm 10 contacts a bottom surface of the hood at a top surface to be coupled and fixed by bolts 27 via coupling holes 11, and serves as a variable bracket.

A hinge support 20 is fixed to a vehicle body by bolts 27, and the hinge arm 10 and the hinge support 20 are hinge-coupled by a first link 40 and a second link 50, which are spaced apart from each other by a predetermined distance.

The hinge arm 10, which is connected with upper end parts of the first link 40 and the second link 50, is formed with an insertion hole or a first hinge hole 12 and a second hinge hole 13 to be hinge-coupled with the hinge support 20 by axial pins 31.

The second link 50 is coupled with the axial pin 31 at a lower end part via a hinge hole 22, which is formed at a side of the hinge support 20, and the first link 40 is coupled with the hinge pin 30 via the slot 60 formed in the hinge support 20.

The hinge support 20 is formed with coupling holes 21 at both front and rear end parts to be coupled with a top surface of the vehicle body by the bolts 27.

The slot 60 is longitudinally formed in the hinge support 20 so that the hinge pin 30 coupled with the lower end part of the first link 40 may be prevented from deviating from the normal hinge operation position under circumstances, but is allowed to deviate from the normal hinge operation position by moving along the slot 60 when an external impact is applied. The slot 60 is mounted with the plate spring 70 for preventing the deviation of the hinge pin 30 from the normal hinge operation position, but is allowing the hinge pin 30 to deviate from the normal hinge operation position by moving along the slot 60 when an external impact is applied.

FIG. 7 shows a preferred embodiment of the present invention, in which the slot 60 is formed horizontally and the hinge pin 30 deviates horizontally from the normal hinge operation position when the hood is applied with collision impact from a pedestrian, and FIG. 8 and FIG. 9 show a hinge pin according to another preferred embodiment of the present invention, which serves as a normal hinge.

That is, the hinge pin 30 is formed with a key 33 which is machined to be integrally attached to a cylindrical column part; the plate spring 70 mounted in the slot 60 is formed with a contacting surface 72 to hold the key 33; and a holding shoulder 71 protrudes by a slight height at a lower part of the plate spring for supporting the rotation of the cylindrical column part.

FIG. 6 shows the normal hinge operation position of the hinge pin 30 hood 1, wherein when the hood 1 is normally opened or closed, the key 33 rotates between the holding shoulder 71 and the contacting surface 72.

FIG. 7 shows the hinge pin 30 deviated from the normal hinge operation position that results, for example, when the hood 1 collides with the head of a pedestrian and an external force is applied to the hood 1 by the collision, wherein the hinge pin 30 deviates from the slightly protruding holding shoulder 71 for supporting the cylindrical column part when the impact force is transmitted to the first link 40.

Therefore, the first link 40 deforms to be withdrawn backwardly while maintaining the connection with the hood 1, so that the impact force of the pedestrian is prevented from being transmitted to the top part of the hood 1.

According to the present invention as above, the hood is deformed, absorbing the impact energy by the withdrawing of the lower end part of the first link along the slot together with the hinge pin when the body of the pedestrian contacts the hood due to a head-on collision of the pedestrian with a running or moving vehicle.

Therefore, the pedestrian is prevented from being injured seriously by the collision with the hood when the body of the pedestrian contacts the hood of the running or moving vehicle.

Further, the impact force applied to the head of the pedestrian is minimized for protecting the pedestrian more safely, so that the reliability and the safety of the vehicle may be improved, meeting the pedestrian safety regulations which are expected to be enforced in several different countries.

It will be apparent to those skilled in the art that various modifications and variations can be made to the device of the present invention without departing from the spirit and scope of the invention. The present invention covers the modifications and variations of this invention provided they come within the scope of the appended claims and their equivalents.

What is claimed is:

1. A vehicle hood hinge comprising:

a hinge arm comprising coupling holes formed therethrough to couple a top surface of the hinge arm to a bottom surface of a hood; and a first hinge hole and a second hinge hole respectively formed at a front part and a rear part of a surface of the hinge arm;

a first link and a second link, of which upper end parts are respectively coupled with the first hinge hole and the second hinge hole of the hinge arm by upper axial pins;

a hinge support comprising a hinge hole formed at a side surface thereof to receive a lower axial pin, which rotatably couples the hinge support with a lower end part of the second link; and coupling holes formed at both front and rear sides of a lower part of the hinge support to receive bolts, which couple a bottom surface of the hinge support with a top surface of a vehicle body;

a slot formed longitudinally in the hinge support to receive a hinge pin, which is coupled to a lower part of the first link; and a plate spring fixedly mounted at an end of the slot and formed with a holding shoulder for preventing the hinge pin from deviating from a normal hinge operation position under normal circumstances, but allowing the hinge pin to deviate from the normal hinge operation position by moving along the slot when an external impact is applied.

2. The vehicle hood hinge of claim 1, wherein the hinge pin comprises a key machined to be integrally formed with a cylindrical column part of the hinge pin and wherein the plate spring comprises a contacting surface formed at a side thereof to contact the key; and wherein the holding shoulder of the plate spring protrudes from a lower part of the slot by a predetermined amount to support a rotation of the cylindrical column part.

* * * * *